(12) United States Patent
Cho

(10) Patent No.: US 7,286,933 B2
(45) Date of Patent: Oct. 23, 2007

(54) GPS/DEAD-RECKONING COMBINATION SYSTEM AND OPERATING METHOD THEREOF

(75) Inventor: Il Soo Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 596 days.

(21) Appl. No.: 10/924,703

(22) Filed: Aug. 23, 2004

(65) Prior Publication Data

US 2005/0049787 A1    Mar. 3, 2005

(30) Foreign Application Priority Data

Aug. 25, 2003    (KR) ...................... 10-2003-0058874

(51) Int. Cl.
*G01C 21/26* (2006.01)
(52) U.S. Cl. ................. 701/216; 701/217; 342/357.06; 342/358
(58) Field of Classification Search ................ 701/213, 701/214, 216, 217, 220, 221; 342/357.06, 342/357.08, 358
See application file for complete search history.

(56) References Cited

U.S. PATENT DOCUMENTS

| | | | | | |
|---|---|---|---|---|---|
| 5,862,511 | A | * | 1/1999 | Croyle et al. | ................ 701/213 |
| 5,887,269 | A | * | 3/1999 | Brunts et al. | ................ 701/208 |
| 6,024,655 | A | * | 2/2000 | Coffee | ........................ 473/407 |
| 6,029,111 | A | * | 2/2000 | Croyle | ........................ 701/207 |
| 6,282,496 | B1 | * | 8/2001 | Chowdhary | ................. 701/220 |
| 6,308,134 | B1 | * | 10/2001 | Croyle et al. | ............... 701/220 |

* cited by examiner

*Primary Examiner*—Gary Chin
(74) *Attorney, Agent, or Firm*—Lee, Hong, Degerman, Kang & Schmadeka

(57) ABSTRACT

The present invention relates to a GPS/dead-reckoning combination system and an operation method of the same. The GPS/dead-reckoning combination system includes a GPS receiver that receives an absolute position data of a moving unit from a GPS; an inertia sensor that measures a displacement of the moving unit based on a dead-reckoning method; a forward and backward movement judging unit that judges a state data concerning a forward or backward movement of the moving unit; a dead-reckoning processor that measures a running distance and a position of the moving unit based on a dead-reckoning method in reference with the data provided from the inertia sensor and the forward and backward movement judging unit; and a computation unit that estimates the current position of the moving unit in reference with the data from the GPS receiver and the dead-reckoning processor.

10 Claims, 6 Drawing Sheets

Fig.6
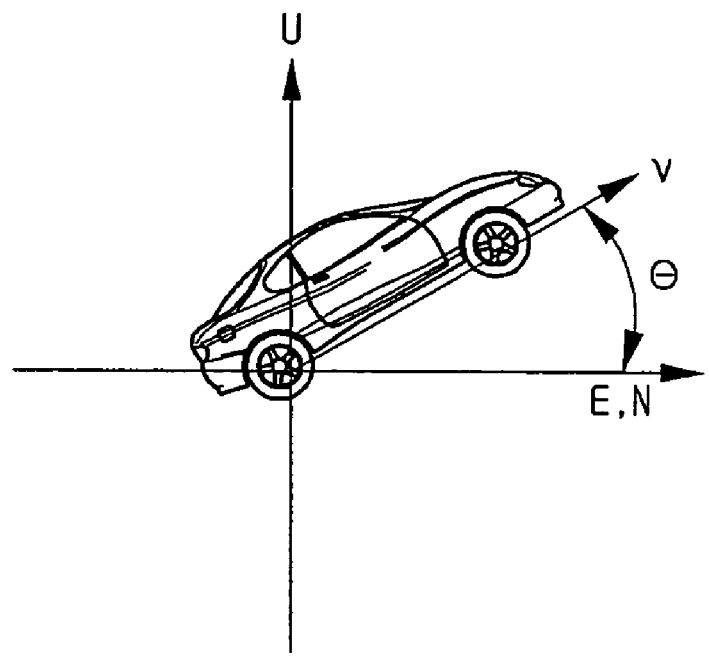
Coordinate viewed from
lateral side of vehicle
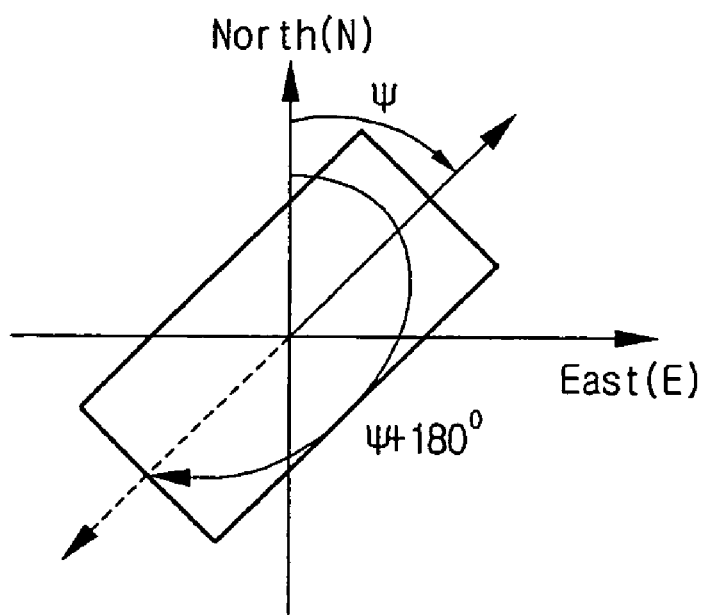
Coordinate viewed from
the top of vehicle

GPS/DEAD-RECKONING COMBINATION SYSTEM AND OPERATING METHOD THEREOF

BACKGROUND OF THE INVENTION

1. Field of the Invention

The present invention relates to a GPS/dead-reckoning combination system, and an operating method thereof.

2. Description of the Background Art

The LBS (Location Based Service) basically includes a GPS (Global Positioning System) receiver for computing an absolute position data and receiving a GPS data. A dead-reckoning system is additionally provided therein for generating a position data in the case that it is impossible to receive a GPS data. Here, the dead-reckoning system is capable of generating a position reckoning data using an inertia sensor (speed/angle sensor).

The GPS represents a global positioning system developed by the department of defense of the US and is capable of computing the position of a measuring person in a 3 D coordinate based on the measured data.

In a navigation system based on GPS, a GPS receiver is necessarily needed. Here, the GPS receiver is designed to receive signals from at least four satellites among 24 satellites flying in the space. In addition, a position vector of a GPS receiver is computed using a distance between a GPS satellite and a GPS receiver and a position vector of the GPS satellite. It is possible to compute the position of a receiver in a 3 D coordinate using the GPS receiver anywhere in the world.

It is possible to obtain a very accurate data using the GPS receiver, but the GPS is basically designed to receive signals only in a limited region in which a satellite signal can be received based on its basic measuring principle.

Namely, since the position of a receiver is computed using a GPS satellite, it is impossible to compute the position of a vehicle that uses a GPS receiver in a tunnel, a forest, a downtown surrounded by high buildings, etc. In addition, a result of position computation is not accurate.

In order to overcome the above problems that a position computation is impossible using a GPS satellite, a dead-reckoning system has been developed for thereby measuring a moving distance and a moving direction of a vehicle and estimating the current position of a vehicle.

The above dead-reckoning system needs a position value that could be used at an initial stage, and a moving distance and a moving direction must be continuously measured based on an initial position of a vehicle using an odometer having a revolution and angle change degree sensor and a gyroscope.

In addition, the dead-reckoning system continuously integrates a revolution and angle change degree based on a result of the measurement for thereby continuously computing the current position of a vehicle without any external assistance.

However, in the dead-reckoning system, an initial position data must be accurately set. In addition, when a vehicle runs for a long time period in a state that a position is estimated using a dead-reckoning system, the positions measured are inaccurate due to an accumulation of the measuring errors of each sensor.

For example, a position estimation must be continuously performed based on a dead-reckoning method in a region in which there is a long tunnel or a region surrounded by high mountains, so that an accumulation error is in proportion to time period.

In order to overcome the above problems, a navigation system has been developed wherein a gyroscope capable of computing a moving direction angle of a vehicle and an odometer capable of computing a moving distance are combined in a GPS. The above system is called a GPS/dead-reckoning combination system because it provides a reference position value needed for a dead-reckoning operation using a GPS receiver.

FIG. 1 is a view illustrating the construction of a related GPS/dead-reckoning combination system.

As shown therein, the related GPS/dead-reckoning combination system 100 includes a GPS receiver 101 capable of receiving an absolute position data of a certain moving unit. The related GPS/dead-reckoning system 100 includes an inertia sensor 102 capable of measuring a displacement of a moving unit, and a dead-reckoning processor 103 capable of measuring a running distance using the inertia sensor 102.

The GPS/dead-reckoning combination system 100 includes a Kalman filter 104 capable of estimating the current position of a certain moving unit using an absolute position data from the GPS receiver 101 and a running distance measured by the dead-reckoning processor 103.

The GPS/dead-reckoning combination system 100 estimates a new position using a moving direction angle and a moving distance measured by the inertia sensor 102 using a result of the position computation of the GPS receiver 101 in a region in which a GPS receiving is available, and a result of the GPS receiving position computation in the latest region.

FIG. 2 is a view for describing a problem occurring when a vehicle backwardly moves along a curved line in the related GPS/dead-reckoning combination system.

Here, a solid line represents a real path that a vehicle backwardly moves at an angle of $\alpha°$, and a dotted line represents an estimated path that a vehicle forwardly moves at an angle of $\alpha°$ based on a dead-reckoning method. Therefore, according to the related GPS/dead-reckoning combination system, when position estimation is performed based on the dead-reckoning method, the current position of a vehicle is estimated assuming that the vehicle is forwardly moved even though the vehicle is actually backwardly moved.

The above problem occurs because a backward movement of a vehicle is not considered in a process algorithm in the related GPS/dead-reckoning combination system. Therefore, when a moving unit is backwardly moved, a position data error may occur in the related art.

FIG. 3 is a view for describing a problem that occurs when a vehicle is forwardly or backwardly moved in the related GPS/dead-reckoning combination system.

As shown therein, a solid line represents a real path that a vehicle is backwardly moved by L1, and is forwardly moved by L2, and is backwardly moved by L3, and a dotted line represents an estimated path that a vehicle is forwardly moved by L1, L2 and L3, respectively.

Therefore, assuming that there are no turn and backward movement, and there are only forward movement and backward movement, as the backward movement is repeatedly performed, the actual position of a moving unit may be largely different from the position estimated by the related GPS/dead-reckoning combination system.

In addition, when the position data is computed using the GPS/dead-reckoning combination system in the areas of high buildings, underground parking lot, and apartment parking lot and under a high level road, more critical error may occur in the position estimation as compared to a region in which the GPS receiving is available.

As a result, the errors occurring in the position estimation of a moving unit could be a very bad problem in the LBS system that needs a very accurate position data.

SUMMARY OF THE INVENTION

Accordingly, it is an object of the present invention to provide a GPS/dead-reckoning combination system and an operation method thereof capable of accurately estimating the current position of a moving unit in such a manner that it is judged whether a certain moving unit is in a forward movement state or a backward movement state, and a forward/backward movement state data of a moving unit are adapted.

To achieve the above objects, there is provided a GPS (Global Positioning System)/dead-reckoning combination system, comprising a GPS receiver that receives an absolute position data of a moving unit from a GPS; an inertia sensor that measures a displacement of the moving unit based on a dead-reckoning method; a forward and backward movement judging unit that judges a state data concerning a forward or backward movement of the moving unit; a dead-reckoning processor that measures a running distance and a position of the moving unit based on a dead-reckoning method in reference with the data provided from the inertia sensor and the forward and backward movement judging unit; and a computation unit that estimates the current position of the moving unit in reference with the data from the GPS receiver and the dead-reckoning processor.

To achieve the above objects, there is provided an operation method of a GPS (Global Positioning System)/dead-reckoning combination system, comprising a step in which it is judged whether a moving unit is in a backward movement state; a step in which when the moving unit is in a backward movement state, it is judged whether the moving unit is in a region in which a GPS data can be received; a step in which when the moving unit is in a region in which the moving unit can receive a GPS data, only a position data of the moving unit based on the GPS is extracted without considering an angle data of the moving unit based on the GPS; and a step in which the current position of the moving unit is estimated by adapting an estimation algorithm based on a dead-reckoning method that uses a position data of the moving unit based on the GPS and a backward movement state data.

BRIEF DESCRIPTION OF THE DRAWINGS

The present invention will become better understood with reference to the accompanying drawings which are given only by way of illustration and thus are not limitative of the present invention.

FIG. 6 is a view schematically illustrating a typical dead-reckoning coordinate.

DETAILED DESCRIPTION OF THE PREFERRED EMBODIMENTS

The preferred embodiments of the present invention will be described with reference to the accompanying drawings.

Figure 1:
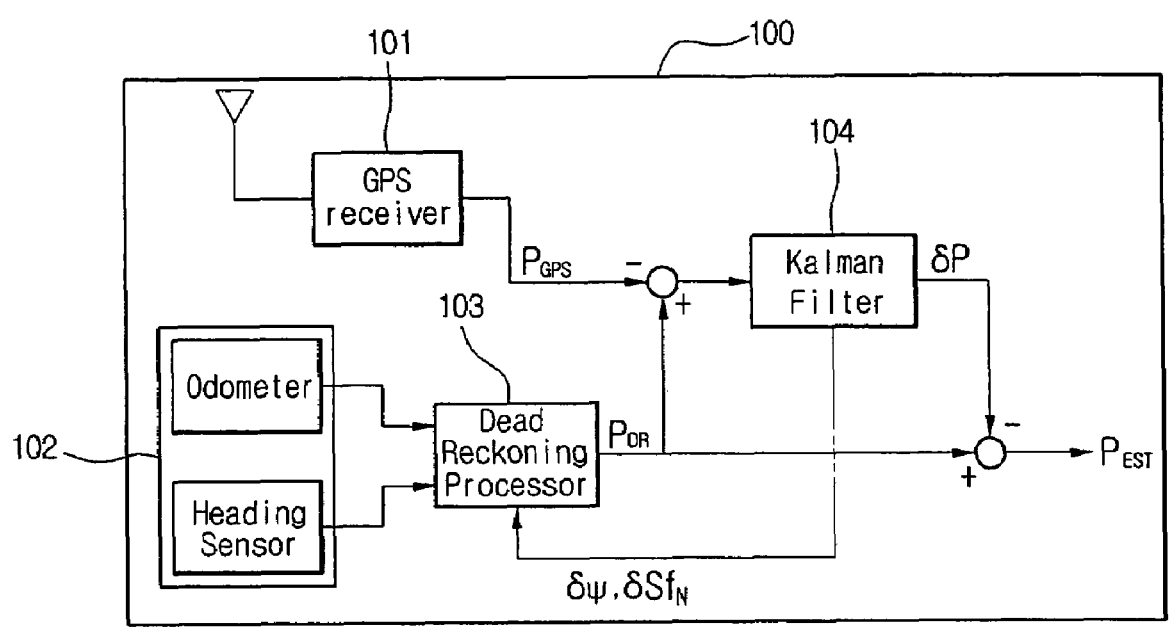
FIG. 1 is a block diagram illustrating the construction of a related GPS/dead-reckoning combination system.
Figure 2:
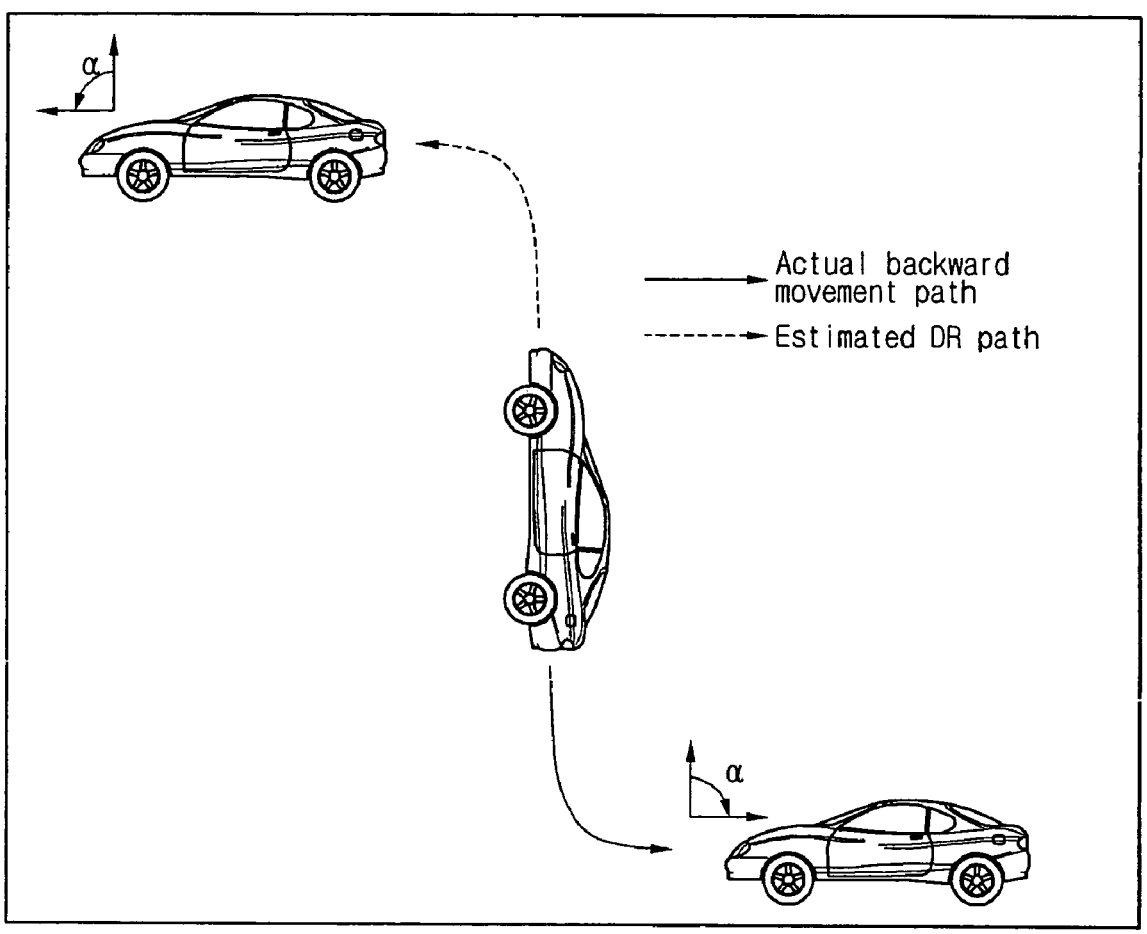
FIG. 2 is a view for describing a problem that occurs when a vehicle is backwardly moved along a curved line in a related GPS/dead-reckoning combination system.
Figure 3:
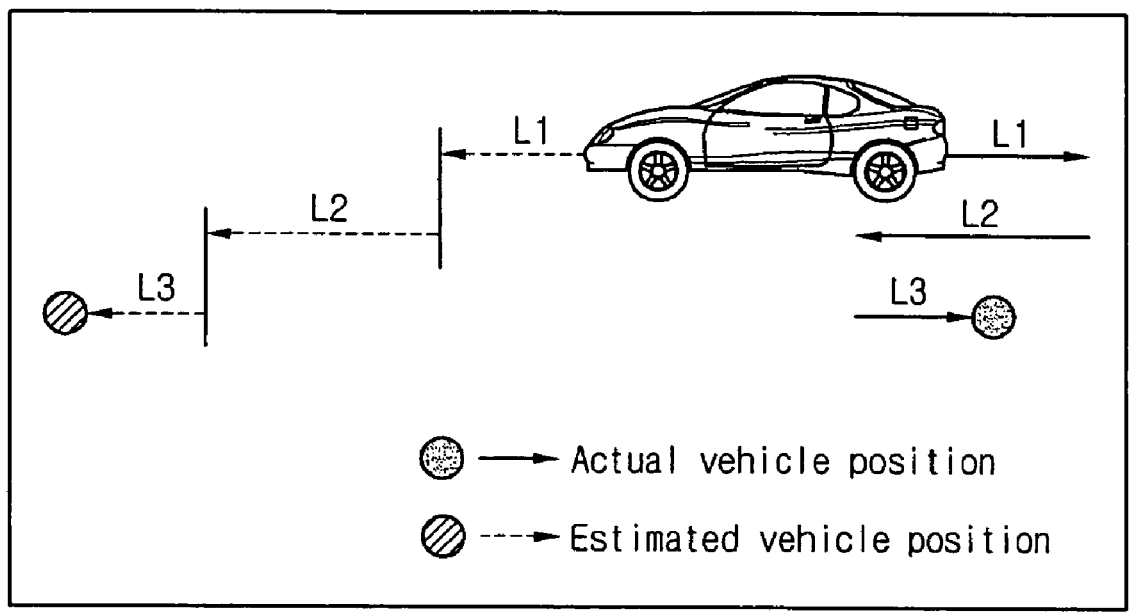
FIG. 3 is a view for describing a problem that occurs when a vehicle is forwardly and backwardly moved in a related GPS/dead-reckoning combination system.
Figure 4:
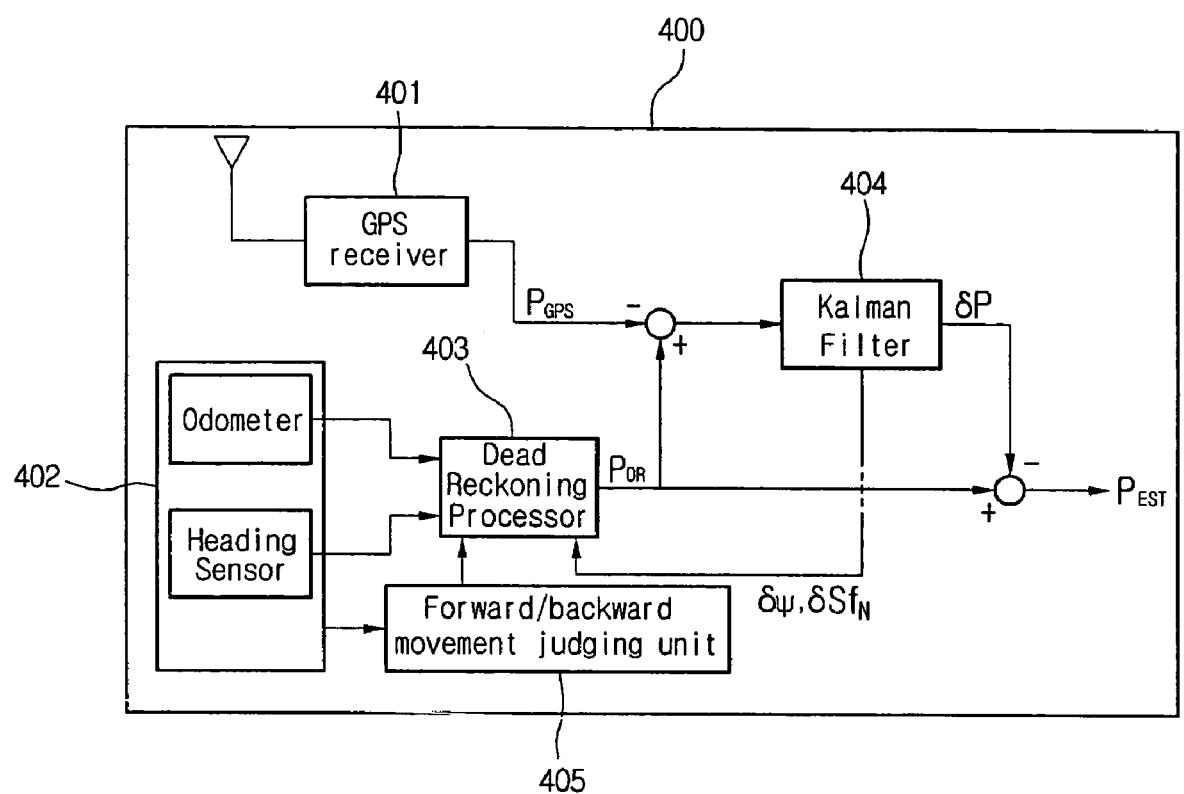
FIG. 4 is a block diagram illustrating the construction of a GPS/dead-reckoning combination system according to the present invention.

FIG. 4 is a block diagram illustrating the construction of a GPS/dead-reckoning combination system according to the present invention.

As shown therein, a GPS/dead-reckoning combination system 400 includes a GPS receiver 401 capable of receiving an absolute position data of a moving unit.

In addition, the GPS/dead-reckoning combination system 400 further includes an inertia sensor 402 for measuring each displacement of a moving unit, and a dead-reckoning processor 403 for measuring a running distance using the inertia sensor 402 for thereby estimating the position of a moving unit.

When a running distance of a moving unit is measured or the position of the same is estimated, the dead-reckoning processor 403 receives a data concerning whether a moving unit is forwardly or backwardly moved, from a forward/backward movement judging unit 405. At this time, the forward or backward movement of the moving unit is judged by the forward/backward movement judging unit 405 in various methods based on the construction of the system. The above methods will be described later.

In addition, the GPS/dead-reckoning combination system 400 further includes a computation unit (not shown) for estimating the current position of a certain moving unit using an absolute position data from the GPS receiver 401 and a running distance measured by the dead-reckoning processor 403. Here, the computation unit is formed of a Kalman filter 404.

Figure 5:
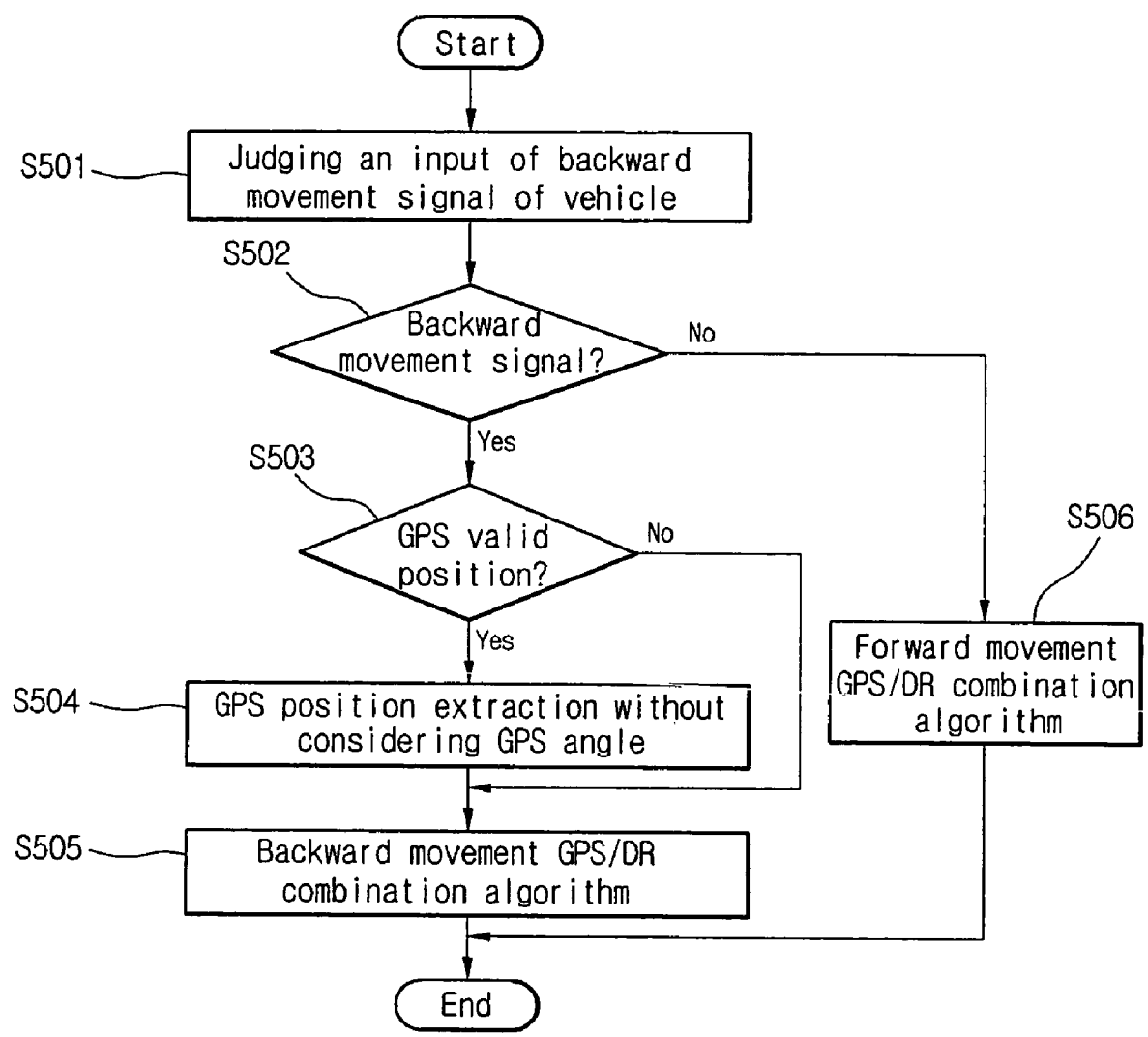
FIG. 5 is a flow chart for describing a position estimation of a moving unit in a GPS/dead-reckoning combination system according to the present invention.

The position estimation method in the GPS/dead-reckoning combination system according to the present invention will be described with reference to FIG. 5. FIG. 5 is a flow chart for describing a position estimation of a moving unit in a GPS/dead-reckoning combination system according to the present invention.

As shown therein, in the GPS/dead-reckoning combination system according to the present invention, there is provided a step S501 in which it is judged whether a backward movement signal is inputted or not in a vehicle.

At this time, the forward and backward movements of the vehicle can be judged based on a translation physical movement detected by the inertia sensor. Here, various kinds of inertia sensors can be used. An odometer could be adapted as a contact type combined inertia sensor, and a non-contact type combined inertia sensor could be adapted. According to the GPS/dead-reckoning combination system according to the present invention, it is possible to achieve a forward and backward movement judgment algorithm irrespective of the kinds of the inertia sensors.

The non-contact type combined inertia sensor system is capable of computing a position data of a moving unit in combination with an accelerator that does not need wiring from a vehicle, and a gyroscope. In addition, the contact type combined inertia sensor system is capable of extracting signals based on wiring from a vehicle for thereby computing a position data.

The combined inertia sensor system is formed of an accelerator and an odometer that are sensors capable of measuring translation movement, and a compass and gyroscope that are sensors capable of measuring a physical degree of a rotational movement.

An odometer that is a typical contact type combined inertia sensor generates a pulse signal in proportion to a speed of a vehicle irrespective of a forward and backward movement of a vehicle. Here, it is possible to compute a speed of a vehicle by multiplying a speed conversion coefficient with a pulse signal. In the related art, even when a vehicle is backwardly moved, it is judged that the vehicle is forwardly moved because it is impossible to judge a backward movement with a pulse signal. Therefore, in the related GPS/dead-reckoning combination system, a big position error occurs in the case that the vehicle is parked after repeated backward and forward movements.

In the GPS/dead-reckoning combination system, the forward and backward movements of the vehicle are judged and adapted as a certain value for thereby preventing an error in the computation of position. As one method for providing a backward and forward movement of a vehicle, a signal of a backward gear operation is received when a vehicle is backwardly moved for thereby judging a forward and backward movement of the vehicle. As shown in FIG. 4, the forward and backward movement judging unit 405 judges the above operation.

When a backward movement signal is received by judging the backward and forward movements of the vehicle in a step S502, it is judged whether a vehicle is positioned within a range in which it is possible to receive a GPS data in a step S503.

As a result of the judgment of the step S503, when the vehicle is positioned within a range in which a GPS signal can be received, only a position data is extracted without considering an angle data based on the GPS in a step S504. Namely, even when the vehicle is a range in which the GPS data can be received, only a position data is extracted without considering a speed component.

Therefore, the current position of a vehicle is estimated by adapting a backward movement GPS/DR combination algorithm based on the above data in a step S505.

In more detail, a backward and forward movement signal of a vehicle is recognized wherein the signal satisfies the characteristics of all sensors, and an algorithm of a dead-reckoning equation is adapted. Here, the dead-reckoning method is directed to a method for computing a position, speed and posture of a moving unit using an initial position, a translation and a rotation physical degree.

FIG. 6 is a view illustrating a typical dead-reckoning coordinate system. As shown therein, assuming that a vehicle posture angle is "y" when a vehicle is forwardly moved, a speed at each axis when a vehicle is backwardly moved is computed by adding 180° to a posture angle when a vehicle is forwardly moved.

As a result, the dead-reckoning equation is obtained based on a certain direction characteristic opposite to a speed component when a vehicle is forwardly moved.

The following equation 1 represents a dead-reckoning equation adapted when a vehicle is backwardly moved.

[Equation 1]

$$P_{DR}(k)=P_{DR}(k-1)+v_{reverse}(k)\cdot \Delta t$$

$P_{DR}(k)$ is the current position of a vehicle, and $P_{DR}(k-1)$ is the previous position of a vehicle, and $\Delta t$ is a measurement cycle.

Here, $v_{reverse}(k)$ can be expressed as follows.

$$v(k) = \begin{bmatrix} v_E(k) \\ v_N(k) \\ v_U(k) \end{bmatrix} = \begin{bmatrix} s(k)\cdot \cos\theta(k)\cdot \sin\psi(k) \\ s(k)\cdot \cos\theta(k)\cdot \cos\psi(k) \\ s(k)\cdot \sin\psi(k) \end{bmatrix}$$

In the above equation, assuming that there is not a backward running, and the vehicle runs on a plane path, and $\theta=0$, $$v_{reverse}(k) = \begin{bmatrix} v_E(k) \\ v_N(k) \\ v_U(k) \end{bmatrix}$$

$$= \begin{bmatrix} s(k)\cdot \sin(\psi(k)+180°) \\ s(k)\cdot \cos(\psi(k)+180°) \\ 0 \end{bmatrix}$$

$$= \begin{bmatrix} -s(k)\cdot \sin\psi(k) \\ -s(k)\cdot \cos\psi(k) \\ 0 \end{bmatrix}$$

Here, $S(k)$ is a speed [m/s] in the direction that a vehicle runs, and, $\Psi(k)$ is a posture angle [deg] of a vehicle, and, $\theta(k)$ is an inclination angle [deg] of a vehicle, and $v(k)$ is a speed vector [m/s].

Therefore, at the time when a user receives a signal generated when a vehicle is backwardly moved, the signal of the odometer of the instant non-contact type inertia sensor is recognized as a signal corresponding to the backward movement of the vehicle, and the algorithm of the backward movement dead-reckoning equation is adapted.

However, in the dead-reckoning method using only the inertia sensor, as the time is passed, errors occur due to some factors such as an initial alignment error (difference between initial position and actual vehicle position of initial posture angle), a computation coefficient error (speed computation coefficient, posture angle computation coefficient), an accumulated error (inherent characteristic of dead-reckoning sensor, etc.

Therefore, when adapting to an actual system, the GPS/dead-reckoning combination system combined with a GPS capable of computing absolute position and a dead reckoning system has been actually used.

In the step S503, when the vehicle is not positioned in a valid region that can receive a GPS data, the backward movement GPS/dead-reckoning combination algorithm is performed in a step S505.

As a result of the judgment of the step S502, when a backward movement signal of a vehicle is not inputted, the movement of the vehicle is judged as a forward movement, and the current position of the vehicle is estimated based on the forward movement GPS/dead-reckoning combination algorithm in a step S506.

The following equation 2 represents the dead-reckoning equation adapted when a vehicle moves in the forward direction.

[Equation 2]

$$P_{DR}(k)=P_{DR}(k-1)+v_{forward}(k)\cdot \Delta t$$

Here, $P_{DR}(k)$ is the current position of a vehicle, and $P_{DR}(k-1)$ is the previous position of a vehicle, and $\Delta t$ is the cycle of measurement.

$$v_{forward}(k) = \begin{bmatrix} v_E(k) \\ v_N(k) \\ v_U(k) \end{bmatrix} = \begin{bmatrix} s(k) \cdot \sin\psi(k) \\ s(k) \cdot \cos\psi(k) \\ 0 \end{bmatrix}$$

Here, S(k) is the speed [m/s] of a vehicle in a direction that the vehicle runs, $\Psi(k)$ is a posture angle [deg] of a vehicle, and $\theta(k)$ is an inclination angle [deg] of a vehicle, and v (k) is a speed vector [m/s].

When the user is forwardly moved, the algorithm based on the forward movement dead-reckoning equation is adapted.

Therefore, in the present invention, it is possible to generate an accurate position data based on the above-described method irrespective of the receiving of a GPS data when the vehicle is backwardly moved, so that a position error problem generated, when the vehicle is backwardly moved, is overcome.

In addition, the present invention may be well adapted to all kinds of dead-reckoning system using a GPS and inertia sensor without an addition of hardware in the location based service system being used in vehicles.

As described above, in the GPS/dead-reckoning combination system and an operation method thereof according to the present invention, it is possible to decrease position estimation errors that may occur when a vehicle with a position generation module is backwardly moved in the GPS/dead-reckoning combination system for thereby significantly enhancing an accuracy in a position data and a quality of a location based service.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A GPS (Global Positioning System) /dead-reckoning combination system, comprising:
    a GPS receiver that receives an absolute position data of a moving unit from a GPS;
    an inertia sensor that measures a displacement of the moving unit based on a dead-reckoning method;
    a forward and backward movement judging unit that judges a state data concerning a forward or backward movement of the moving unit;
    a dead-reckoning processor that measures a running distance and a position of the moving unit based on a dead-reckoning method in reference with the data provided from the inertia sensor and the forward and backward movement judging unit; and
    a computation unit that estimates the current position of the moving unit in reference with the data from the GPS receiver and the dead-reckoning processor.

2. The system of claim 1, wherein said moving unit is a vehicle.

3. The system of claim 2, wherein said forward and backward movement judging unit judges the vehicle as it is in a backward movement state when a backward movement gear signal is inputted in the vehicle.

4. The system of claim 1, wherein said computation unit includes a Kalman filter.

5. The system of claim 1, wherein when estimating the current position of the moving unit, said computation unit is directed to estimating the current position of the moving unit by adapting a position estimation algorithm based on a dead-reckoning method using the position data of the moving unit from the GPS and the backward movement state data of the moving unit in the case that the moving unit is in the backward movement, and the moving unit is in a region in which the moving unit can receive a GPS data.

6. The system of claim 1, wherein when estimating the current position of the moving unit, said computation unit is directed to estimating the current position of the moving unit by adapting a position estimation algorithm based on a dead-reckoning method that obtains a position data of the moving unit by the dead-reckoning method and uses the backward movement state data in the case that the moving unit is in the backward movement, and the moving unit is in a region in which the moving unit can't receive a GPS data.

7. An operation method of a GPS (Global Positioning System)/dead-reckoning combination system, comprising:
    judging whether a moving unit is in a backward movement state;
    judging whether the moving unit is in a region in which a GPS data can be received, when the moving unit is in the backward movement state;
    extracting only a position data of the moving unit based on the GPS without considering an angle data of the moving unit based on the GPS, when the moving unit is in a region in which the moving unit can receive a GPS data;
    estimating the current position of the moving unit by adapting an estimation algorithm based on a dead-reckoning method that uses a position data of the moving unit based on the GPS and a backward movement state data.

8. The method of claim 7, wherein said moving unit is a vehicle.

9. The method of claim 8, wherein when judging whether the vehicle is in a backward movement state, it is judged that the vehicle is in the backward movement state when a backward movement gear signal is inputted in the vehicle.

10. The method of claim 7, further comprising a step in which when the moving unit is not in a region in which the GPS data can be received, the current position of the vehicle is estimated by adapting a position estimation algorithm based on a dead-reckoning method that obtains a position data of the moving unit and uses the backward movement state data.

* * * * *